United States Patent
De La Gorce (10) Patent No.: US 9,734,809 B2
(45) Date of Patent: Aug. 15, 2017

(54) DIGITAL CONTROL OF THE SOUND EFFECTS OF A MUSICAL INSTRUMENT

(71) Applicant: Baptiste De La Gorce, Lille (FR)

(72) Inventor: Baptiste De La Gorce, Lille (FR)

( * ) Notice: Subject to any disclaimer, the term of this patent is extended or adjusted under 35 U.S.C. 154(b) by 0 days.

(21) Appl. No.: 14/256,920

(22) Filed: Apr. 18, 2014

(65) Prior Publication Data

US 2014/0311322 A1 Oct. 23, 2014

(30) Foreign Application Priority Data

Apr. 19, 2013 (FR) ...................... 13 53624

(51) Int. Cl.
*G01P 3/00* (2006.01)
*G10H 7/00* (2006.01)
(Continued)

(52) U.S. Cl.
CPC ....... *G10H 1/0008* (2013.01); *G06K 9/00302* (2013.01); *G06K 9/6202* (2013.01);
(Continued)

(58) Field of Classification Search
CPC ......... G06F 17/30772; G06F 2203/011; G10H 1/008; G10H 1/0091; G10H 2220/455;
(Continued)

(56) References Cited

U.S. PATENT DOCUMENTS 8,796,529 B2* 8/2014 Butera et al. ............. 84/722
9,069,381 B2* 6/2015 Geisner et al.
(Continued)

OTHER PUBLICATIONS

David Merill "Head-Tracking for Gestural and Continuous Control of Parametrized Audio Effects" published May 22, 2003.
(Continued)

*Primary Examiner* — Jeffrey Donels (57) ABSTRACT

The object of the present invention concerns a control device (100) for a generation module (GM) of sound effects ($EF_A$, $EF_B$) of a musical instrument (MI), such device comprising computer software configured for: —the capture, using a digital camera (10), of at least one digital image (I) comprising at least one portion of the user's (U) face; —processing of such at least one image (I) to define expression data ($D\_EX_i$, i being a positive integer) containing information relating to facial expressions ($EX_a$, $EX_b$) of the user (U); —an analysis of such expression data ($D\_EX_i$) using a predefined first database (DB1) to determine a sound effect data ($D\_EF_j$, j being a positive integer) containing information relating to at least one sound effect ($EF_A$, $EF_B$) corresponding to the facial expression ($EX_a$, $EX_b$) of the user (U).

12 Claims, 3 Drawing Sheets

(51) Int. Cl.
*G10H 1/00* (2006.01)
*G06K 9/00* (2006.01)
*G06K 9/62* (2006.01)

(52) U.S. Cl.
CPC ..... *G10H 1/0091* (2013.01); *G10H 2220/455* (2013.01); *G10H 2250/641* (2013.01)

(58) Field of Classification Search
CPC ......... G10H 2250/641; G06K 9/00302; G06K 9/6202
USPC .......................................................... 84/626
See application file for complete search history.

(56) References Cited

U.S. PATENT DOCUMENTS

| | | | |
|---|---|---|---|
| 2002/0019678 A1 | 2/2002 | Mizokawa | |
| 2009/0002178 A1* | 1/2009 | Guday et al. | 340/573.1 |
| 2009/0116684 A1* | 5/2009 | Andreasson | 382/100 |
| 2012/0206603 A1* | 8/2012 | Rekimto et al. | 348/156 |

OTHER PUBLICATIONS

Kia "Music via Motion: Transdomain Mapping of Motion and Sound for Interactive Performances" published Apr. 4, 2004.
Luke Barrington "Ambient Display using Musical Effects" published Jan. 29, 2006.
Mathias Funk et al "Sonification of Facial Actions for Musical Expression" published Jan. 1, 2005.
Michael Lyons et al "Facing the Music A Facial Action Controlled Musical Interface" published Mar. 31, 2001.
Morimoto "Pupil detection and tracking using multiple light sources" published Feb. 17, 2000.
Roberto Valenti "Facial Expression Recognition as a Creative Interface" published Jan. 13, 2008.
Roberto Valenti "Sonify Your Face Facial Expressions for Sound Generation" published Oct. 25, 2010.
Vaishakh et al "Sonification of Facial Expression Using Dense Optical Flow on Segmented Facial Plane" published Apr. 12, 2012.

* cited by examiner

DIGITAL CONTROL OF THE SOUND EFFECTS OF A MUSICAL INSTRUMENT

CROSS-REFERENCE TO RELATED APPLICATION

This application is based upon and claims the benefit of priority from prior French Patent Application No. 13 53624 filed on Apr. 19, 2013 in France, the entire contents of which are incorporated herein for reference.

BACKGROUND OF THE INVENTION

1. Field of the Invention

The present invention relates to the field of sound effect control for musical instruments.

More specifically, the present invention aims to facilitate digital control of sound effects of a musical instrument for musicians.

The present invention therefore has several useful applications in the field of music, particularly for controlling the sound effects of a musical instrument such as a guitar. Evidently, other useful applications may also be conceived by using the digital control proposed herein according to the present invention.

2. Description of the Related Art

Electronics and computer software now hold a central place in the field of music production: indeed, electronics and computer software enable the transformation and/or synthesis of new sounds to enrich musical compositions. The present description entirely focuses on sound effects. Purely illustrative and non-restrictive examples include effects such as "fading", audio filtering, echo, or the creation of a synthetic/electronic sound or reading a sound from a predetermined sound bank, etc.

However, the possibilities for a musician to physical interact with electronic and computer software interfaces to control these sound effects often remain incompatible with those offered by physical musical instruments. As such, using such interfaces can often actually compromise the musical performance itself.

These control interfaces generally comprise a mouse, a keyboard and a screen (sometimes tactile) one or several potentiometers, or one or several pedals, etc.

The Applicant observes that such interfaces are difficult for a musician using their hands and/or feet to play their instrument to manipulate: a guitarist has one hand on the neck of their guitar and their other hand occupied strumming the strings; a pianist generally has both hands on the piano keys and their feet engaged in operating the pedals; a Disc Jockey has one hand on the vinyl disc and the other on the crossfader of their mixing table.

Studying these interfaces more closely, we can currently distinguish several techniques which enable musicians to control sound effects: use of manual controls, foot controls, mouth controls or the use of vocoders.

Manual control interfaces are one of the most common solutions for controlling sound effects: yet these interfaces usually enable the user to independently control only one parameter at a time; these manually activated interfaces are moreover not particularly accessible to musicians such as guitarists, whose hands are occupied playing their instrument. As such, these interfaces are generally only used to modify sound loops which have already been recorded and/or to set the sound before playing.

Use of foot-controlled interfaces (or a pedal) is another classic way to control sound effects. However, when using a pedal, as when using a manual controller, it is only possible to control one parameter at a time. Moreover, when using a pedal, the musician cannot move around on stage as they would like to. Furthermore, using a pedal is difficult for both spatial and temporal precision: it requires both dexterity and a lot of practice.

Alternatively, there are certain interfaces which enable sound effect control using the mouth: this is known as the "talk box". More specifically, the talk box is a device which enables amplified sounds to be modified using the mouth.

This device is in the form of a tube which the musician places in their mouth. This tube consists of a pipe in which the sound produced by a guitar, for example, is disseminated. The tube is thus connected to a funnel located opposite the loudspeaker of the guitar. As such, when the musician plays, the sound travels up the tube to their mouth, where it is then adjusted by the variable openings of the mouth; the form of the mouth cavity, and the position of the mouth and/or lips of the musician. The guitar therefore "speaks" according to the musician's mouth cavity. The microphone then captures the sound.

The disadvantages of such controller are numerous: beyond the unaesthetic appearance of this device, which requires keeping a tube in the mouth, such device only enables the control of one type of effect: acoustic filtering using the mouth.

The Applicant moreover argues that such device is not popular among many musicians.

Among existing sound effect controllers, there is the vocoder. The vocoder is an electronic sound signal processing device which analyses the main spectral components of a voice or another sound, and which makes a synthetic sound from such analysis.

The disadvantages of the vocoder are numerous: such a system only enables the control of one type of effect, filtering via spectral envelopment of the sound emitted by the mouth. Moreover, where the background acoustic sound is used, such system is sensitive to background noise.

As such, the Applicant argues that the prior art identified hereabove does not provide satisfactory solutions to enable musicians to easily and effectively control the sound effects of a musical instrument. Indeed, none of the approaches proposed in the prior art enables precise and easy control of several sound effects simultaneously while enabling the musician to move around freely (on stage, for example).

SUMMARY OF THE INVENTION

The present invention aims to improve the situation described hereabove.

As such, the present invention provides a simple and clever solution for controlling the sound effects of a musical instrument.

The present invention therefore regards a control process for a generation module of sound effects to control the sound effects of a musical instrument.

The process according to the present invention is implemented using a computer software and comprises an acquisition stage which consists of capturing, using a digital camera, at least one digital image comprising at least a portion of the user's face (here, a musician, for example).

The concept underpinning the present invention is to exploit current image processing techniques to recognize, within the captured image, at least one expression within at least a portion of the user's face and to control, according to each expression, one or several sound effects of a musical instrument.

As such, the process according to the present invention comprises a processing stage which consists of processing such at least one image, captured during the capture stage, to determine one or several expression data containing information relating to at least one of the user's facial expressions (for example, the degree of vertical opening of the mouth, the degree of frowning eyebrows, a wink, or similarity with a general facial expression: "sad", "happy", "surprised", "scared", weighting between several per-recorded general facial expressions, etc.).

By 'facial expression' in the sense of the present invention, and throughout the present description which follows, a facial expression may be:

either general: concerning a general facial expression, for example, when the user manifests a "sad", "happy" or "surprised" expression,     or localized: for example, when the user makes a movement (expression) with a portion of their face (wink, opening the mouth, frowning eyebrows, etc.).

By expression recognition, in the sense of the present invention, and throughout the present description which follows, is meant a continual recognition of expressions.

In other words, the recognition of facial expressions during the processing stage is not binary, it rather enables the recognition of intermediary expressions between pre-established expressions, by providing expression data relating, for example, with expression percentages (in comparison to a neutral expression), or with weighting between several expressions, or similarity values relating to different expressions.

According to the present invention, a predefined first database comprises a multitude of expression data, each of which is associated with one or several sound effect data.

As such, in this database, there is a pre-established relationship, which may be configured by the user before use, between one or several facial expressions (for example, opening of the mouth measuring a specific diameter) and one or several sound effects (for example, a sound effect such as "fading" and/or echo). It is therefore possible to envisage that a facial expression could be associated with several sound effects. The present invention therefore makes it possible to control several sound effects simultaneously, with no restriction on the number of sound effects.

By enabling an association between an expression and one or several sound effects, the database enables the user to define the desired sound result for a certain number of expressions.

Furthermore the database allows the user to configure the behavior of the sound effects to the intermediate expressions (for example, a "sound morphing" between the effects associated with the various expressions).

The behavior of the sound effects between or around the expressions recorded in this database may be of a different kind. For example and non-restrictively: a progressive sound morphing as an expression is progressively formed according to a curve, or the trigger of the sound effect associated with an expression, above a threshold of similarity between the user's actual expression and such expression, etc. . . . .

The process according to the present invention exploits this relationship between sound effect data and expression data.

For this, the process according to the present invention comprises an analysis stage during which the expression data, which were defined during the processing stage, are compared with this first database to determine one or several new sound effect data, each of which contain information relating to the sound effect(s) corresponding to the user's facial expression(s).

This analysis therefore uses a correspondence map between the sound effect data and the expression data, which is recorded in the database.

As such, when the user changes from one expression to another, the analysis can, for example, determine new sound effect data which passes continuously from the first sound effect data associated with the first expression, to the second sound effect data associated with the second expression, from the expression data (containing the weighting of the two expressions) and the correspondence map. This is called "sound morphing".

As such, this succession of technical stages, characteristic of the present invention, enables digital control of the sound effects of a musical instrument via one or several of the musician's facial expressions.

The present invention therefore enables a musician to (simultaneously) control the desired sound effects while his hands and feet remain free to play his instrument. The musician can also, using the present invention, move around freely on stage.

Using the present invention, the musician can, according to their presettings, control and produce a very large range of sound effects.

The capture stage uses a camera which is sensitive to near-infrared wavelengths.

The capture stage also comprises the emission of a source of light, preferably of infrared wavelength ranging between approximately 700 to 3000 nanometers, and preferably uniformly, in the direction of the portion of the user's face.

The capture stage also comprises the use of an optical filter which preferably only allows the passage of a frequency band set around to the frequency of the emitted light, before the capture of each image. This removes all other frequencies corresponding to other light sources which could potentially perturb the recognition of expressions.

As such, the musician can control the sound effects of their musical instrument in a concert environment, for example, an environment with low or changing lighting (for example, light sets with spotlights).

According to one variation, the capture stage consists of capturing at least two digital images. In this variation, the process usefully comprises a temporal interpolation stage during which expression data or sound effect data which are determined after the analysis stage, are interpolated to obtain a multitude of intermediary sound effect data between two successive digital images.

This ensures the quality of the sound effects. Indeed, a conventional digital camera captures images generally at a frequency that is between about 25 and 200 images per second.

The time interval between two successive images therefore ranges between 5 and 40 milliseconds.

As such, an expression data, and thus a sound data, is sent every 5 to 40 milliseconds to the generation module of sound effects. However, the human ear is sensitive to shorter time intervals. As such, without this interpolation stage, the perceived sound could present a "stairway effect". To resolve this problem, the present invention incorporates the interpolation of values of expression data or sound effect data between two images, and sending intermediary values between these to produce a "smooth" sound.

The present invention therefore envisages the application of a temporal interpolation algorithm which sends intermediary values.

This interpolation stage can also interpolate expression data.

The processing stage comprises the application of an image processing algorithm for each digital image captured to recognize the user's facial expression(s). For example, computer image processing algorithms enabling the automatic recognition of a shape or movement in an image or succession of images.

Recognition of the user's facial expression(s) may also be implemented via recognition of facial descriptors (for example, the parameters of a 3D model of a face recognized in the image, or distinctive point coordinates in the image), and analyzing such information by comparing it to a second database comprising a predefined bank of expressions (predetermined or recorded by the user).

In other words, the processing stage comprises a comparison between facial descriptors (here, for example, the parameters of a 3D model of a face recognized in the image, or distinctive point coordinates in the image, etc) and a second database comprising a mapping between facial descriptors and one or several facial expressions predefined or recorded by the user.

This second database enables the user to record their own expressions and thus obtain customized recognition of personal expressions.

Expressions in this database can be learned from facial images captured by the camera. It also enables the user to record new expressions from "photographs" or video capture.

As such, the user can easily record the expressions which certain sound results (i.e. sound effects and their settings) evoke for him, in this second database and associate these expressions with effect data within the first database.

Furthermore, the possibility for the user to register their own expressions from facial images captured by the camera enables a more reliable and precise recognition of expressions during the processing stage, for such user, as such recognition is personalized to their own morphology and expressions.

Correlatively, the object of the present invention is a computer program comprising instructions for the implementation of control process stages such as those described hereabove, particularly when such computer program is executed by at least one processor.

Such computer program may use any programming language, and may be in the form such as a source code, an object code, or an intermediary code between a source code and an object code, such as a partially compiled form, or in any other form desired.

Likewise, the object of the present invention includes a recording medium readable by a computer upon which a computer program is recorded which comprises instructions for carrying out all the stages of the process as described hereabove.

On the one hand, the recording medium may be any entity or device capable of storing the program. For example, the medium may comprise a storage medium, such as ROM memory, for example, a CD-ROM or ROM memory such as a microelectronic circuit, or a magnetic recording medium, for example, a diskette such as a "floppy disc" or hard drive.

On the other hand, such recording medium may also be a transmitting medium such as an electrical or optical signal which may be transferred via an electrical or optical cable, by traditional or Hertzian radio or self-directed laser ray, or using other media. In particular, the computer program, according to this invention, may be downloaded via a network such as the internet.

Alternatively, the recording medium may be an integrated circuit into which the computer program is incorporated, the integrated circuit being adapted to implement, or to be used in the implementation of, the process in question.

The object of the present invention also includes the control device for a generation module of sound effects, to control the sound effects of a musical instrument.

The control device according to the present invention comprises computer software to implement the process as described hereabove.

More specifically, the control device according to the present invention comprises in particular:
  a capture module comprising a digital camera configured to capture one or several digital images, each comprising at least a portion of the user's face;
  a computer processing module which is configured to process each image in order to define at least one expression data containing information relating to at least one facial expression of the user; and
  an analysis module which is configured to compare such at least one expression data with a predefined first database in order to determine at least one sound effect data which contains information relating to at least one sound effect corresponding to such at least one facial expression of the user, such first database comprising a multitude of expression data, each associated with one or several sound effect data.

The capture module comprises a camera which is sensitive to near-infrared wavelengths.

The capture module comprises an emission medium configured to emit a source of light, preferably of infrared wavelength ranging between approximately 700 to 3000 nanometers and preferably uniform, in the direction of the portion of the user's face.

The capture module comprises a filtering medium, such as an optical filter, which preferably only allows the passage of a frequency band set around to the frequency of the emitted light, before the capture of each image.

The control device according to the present invention comprises an interpolation module configured to interpolate the sound effect data and/or expression data to obtain a multitude of intermediary sound effect data and/or expression data between two successive digital images.

The computer processing module is configured to enable the application of an image processing algorithm for each digital image to recognize at least one facial expression of the user.

The processing module internally uses the comparison of facial descriptors with a second database, comprising a mapping between the facial descriptors and one or several facial expressions predetermined or recorded by the user Such second database comprises a mapping between facial descriptors and one or several facial expressions, which may be partially or totally learned from facial images captured by the camera As such, the object of the present invention, with it's various functional and structural aspects, as described hereabove, provides a new approach enabling musicians to control one or several sound effects; the approach proposed according to the present invention resolves the various disadvantages identified in the prior art, enabling in particular:
  simultaneous control of several sound effects,
  the possibility for the musician to use both hands for playing their instrument, and
  the possibility for the musician to move around on stage.

BRIEF DESCRIPTION OF THE SEVERAL VIEWS OF THE DRAWING

Further characteristics and advantages of the present invention will be highlighted in the description herein, referring to FIGS. 1 to 3 in annex, which illustrate an example of a non-restrictive embodiment and for which.

DETAILED DESCRIPTION OF THE INVENTION

A control process for a generation module GM of sound effects, along with the associated control device 100 will be described hereafter in the following description which refers collectively to FIGS. 1 to 3.

Enables simultaneous control of one or several sound effects of a musical instrument MI, while enabling the musician U to have their hands and feet free, is one of the objectives of the present invention.

The present invention therefore proposes a new way to interact with generation modules GM of sound effects. For this, the invention proposes a control device 100, based on an analysis in real-time of a video capture of the musician's U face; in other words, with the present invention, musicians U can now control sound effects $EF_A$, $EF_B$, and/or $EF_C$ with part of their face (for example, a mouth movement) or by simulating a general facial expression (for example, by making a "sad" or "happy" expression).

To illustrate the numerous possible embodiments of the present invention, the various facial expressions considered here in the present example are as follows (see FIG. 2): a localized facial expression, with an open mouth illustrated in $EX_a$, of a localized facial expression with a wink illustrated in $EX_b$, a general "happy" facial expression illustrated in $EX_c$, or a general "sad" facial expression illustrated in $EX_d$.

Evidently, it is understood that other facial expressions (localized or general) may be envisaged within the present invention (turning the head; cheek, nostril, or eyebrow movements; a "scared" or "tired" expression, etc.).

In the example described here, the musician U first records their desired parameter settings: for each facial expression cited hereabove $EX_a$, $EX_b$, $EX_c$, $EX_d$, they associate at least one sound effect $EF_A$, $EF_B$, and/or $EF_C$.

The musician must therefore, during their first use, record on a first database DB1, during a parameter setting stage S0 a correspondence map between expression data $D\_EX_1$, $D\_EX_2$, $D\_EX_3$ and $D\_EX_4$ ($D\_EX_i$, where i is a positive integer ranging between 1 and N, N being here equal to 4) respectively related to expressions $EX_a$, $EX_b$, $EX_c$, and $EX_d$, and sound effect data $D\_EF_1$, $D\_EF_2$, $D\_EF_3$ and $D\_EF_4$ ($D\_EF_j$, where j is a positive integer ranging between 1 and M, M being here equal to 4) each respectively containing information relating to at least one sound effect $EF_A$, $EF_B$, and/or $EF_C$.

In one embodiment, the musician may create his own expressions from digital images I of their face captured by the camera, to record his own "happy" expression $EX_c$, or charge a predefined bank of expressions. Then, he will record an association between each expression and at least one predefined sound effect.

Figure 2:
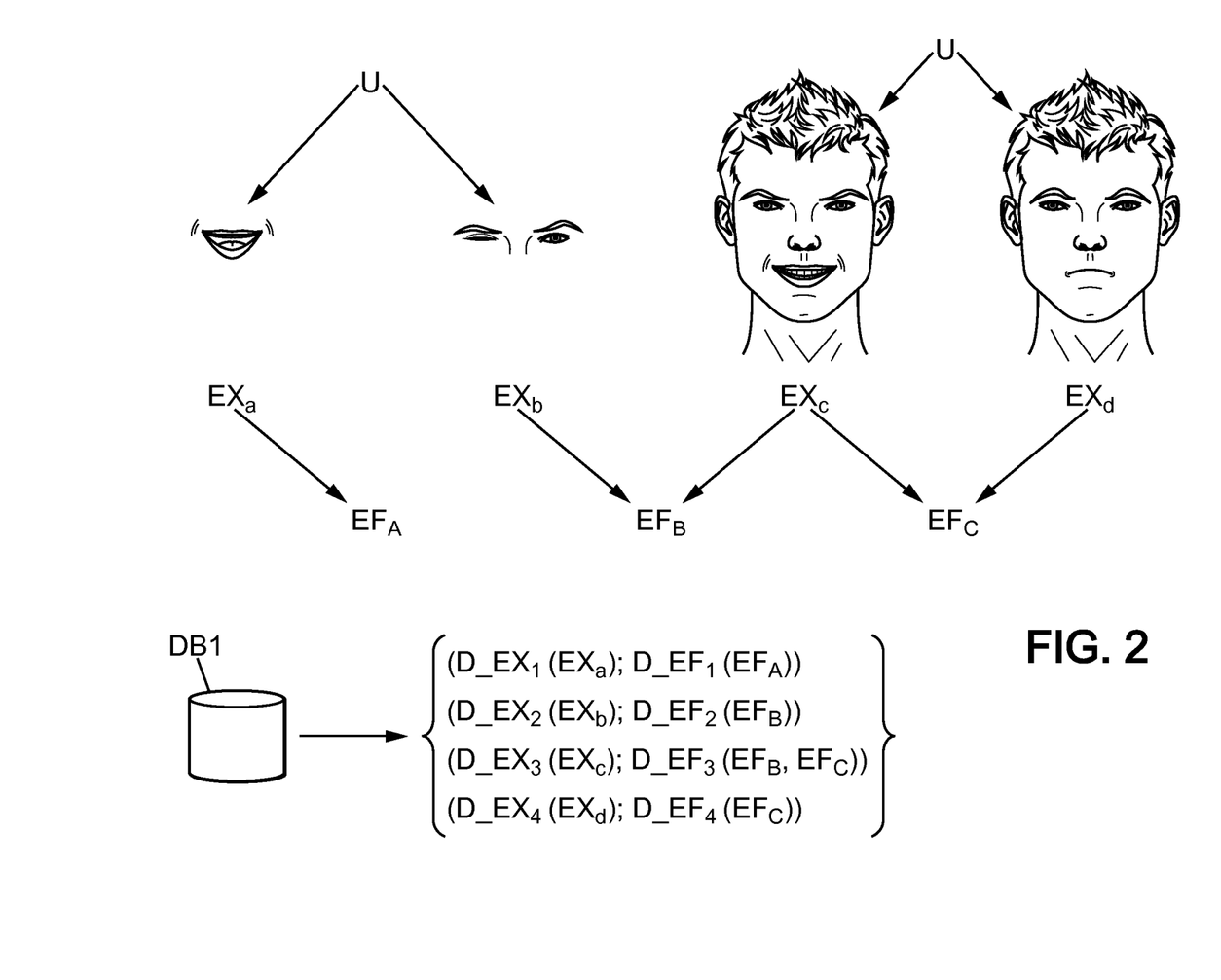
FIG. 2 schematically represents a non-restrictive example of the correspondence map between the user's facial expressions and sound effects.

In the example described here, and as illustrated in FIG. 2, sound effect data $D\_EF_1$ comprises information relating to sound effects $EF_A$; sound effect data $D\_EF_2$ comprises information relating to sound effects $EF_B$; sound effect data $D\_EF_3$ comprises information relating to sound effects $EF_B$ and $EF_C$; sound effect data $D\_EF_4$ comprises information relating to sound effects $EF_C$.

Evidently, this example is purely illustrative and is in no way restrictive; other combinations with other sound effects are possible and conceivable for someone skilled in the art.

As stated hereabove, this parameter setting S0 may also be prerecorded on the device 100 which, in such case, comprises a first database DB1, predefined by default, comprising the correspondence map as detailed hereabove and illustrated in FIG. 2.

The present invention exploits this database DB1 through automatic recognition of facial expressions $EX_a$, $EX_b$, $EX_c$, $EX_d$ to control sound effects $EF_A$, $EF_B$, $EF_C$ and $EF_D$.

As such, the control device 100, according to the present invention, comprises a capture module M1 comprising a classic digital camera 10 configured to capture, during a capture stage S1, at least one digital image I comprising at least a portion of the musician's U face.

Optionally, this digital camera 10 can be attached, remaining detachable, on a pivoting arm (not shown here) to easily turn the camera in all directions so that the musician U can adjust the pivoting arm so that the camera 10 points in the direction of their face.

This pivoting arm may be attached directly on the musical instrument MI. Preferably, this camera 10 is linked to the module by a USB connector which is directly integrated within the pivoting arm.

Alternatively, this camera 10 may also be positioned further away in order to capture the whole scene in it's field of vision.

In any event, in the example described herein, the camera 10 captures at least one image I comprising a portion of the musician's U face.

In the example described herein, the musician U performs on stage in an environment presenting numerous variations in lighting and luminosity. To resolve this issue and make recognition of facial expressions more precise and reliable, the present invention envisages, during the capture stage S1, the emission of a source of infrared light LUX_IR in the direction of the musician U, using an emission medium 20 such as infrared LED (here emitting a wavelength of 850 nanometers, but other wavelengths are possible).

The capture module M1 furthermore comprises an infrared optical filter 30, to only allow, during IRF ("Infrared Filtering"), the passage of a narrow infrared frequency band set around the wavelength emitted (the filtered image here corresponds to a wavelength ranging between approximately 840 to 860 nanometers).

The emission of a source of infrared light LUX_IR on the face of the musician U and the application of an infrared filtering IRF before the capture of the image I, make the process insensitive to variations of light and lighting on stage, thus making the analysis of facial expressions more reliable, whatever the surrounding lighting conditions.

As stated hereabove, control of sound effects requires: on the one hand, the capture of one or several digital images I comprising at least a portion of the musician's U face, and, on the other hand, recognition of one or several facial expressions of the musician U.

Such recognition of facial expressions for controlling the sound effects of a musical instrument is characteristic of the present invention.

Figure 1:
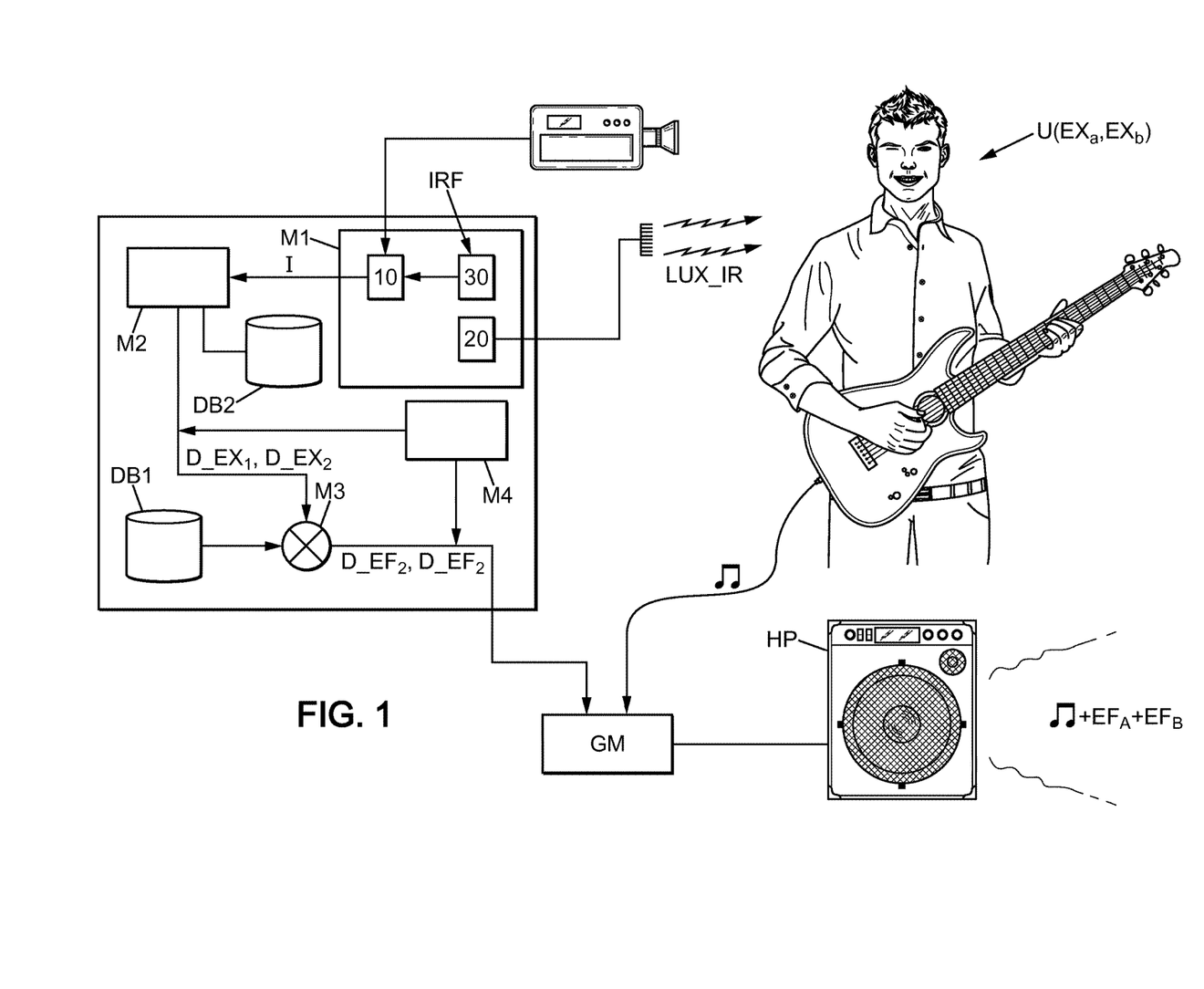
FIG. 1 schematically represents a control device for a generation module of sound effects to control one or several sound effects for a musical instrument according to an example of an embodiment.
Figure 3:
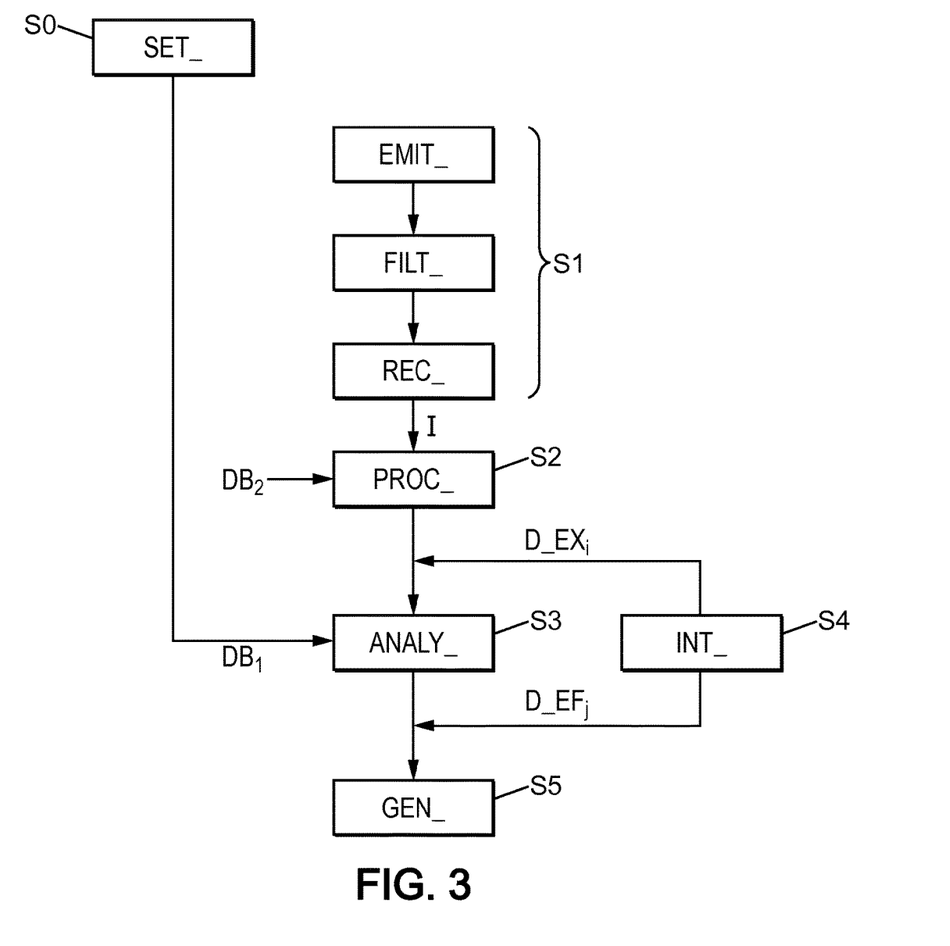
FIG. 3 consists of a flow chart representing the various stages of implementation according to an example of an embodiment of the invention process.

As such, in the example described herein, and as illustrated in FIGS. 1 and 3, the control device 100 comprises a computer processing module M2 which is configured to apply, during a processing stage S2, a mathematical image processing algorithm on each digital image I captured in order to recognize at least one of the user's U facial expressions.

Furthermore, it is also possible to envisage that the processing stage S2 could consist of identifying facial descriptors $F\_D_k$ (with k being an integer), comprising parameters of a 3D model of a face recognized in the image I and/or distinctive point coordinates in the image I, and compare such descriptors with a second database DB2 comprising a bank of facial expressions which are either predetermined or recorded by the musician. This comparison enables determination of the musician's facial expression.

In the example described herein, and illustrated in FIG. 1, using this automatic recognition, the device 100 recognizes expressions $EX_A$ (open mouth) and $EX_B$ (wink) of the musician's U face in the image I.

Expression data $D\_EX_1$ and expression data $D\_EX_2$ are obtained in the output of module M2, respectively comprising information relating to expressions $EX_A$ and $EX_B$.

These expression data $D\_EX_1$ and $D\_EX_2$ are then analyzed by a module M3 during an analysis phase S3. The analysis module M3 compares each expression data $D\_EX_1$ and $D\_EX_2$ to the first database DB1 described hereabove to determine the corresponding sound effect data, i.e. in the example described herein, a weighted combination of sound effect data $D\_EF_1$ for the "open mouth" expression and sound effect data $D\_EF_2$ for the "wink" expression.

The combination of sound effect data $D\_EF_1$ and $D\_EF_2$ is then sent to the generation module GM which is linked to the amplification system HP, and which, during stage S5, enables the production and generation of the sounds of the musical instrument associated with sound effects $EF_A$ and $EF_B$.

As stated hereabove, the present invention also envisages a post-processing step at output of the analysis module M3 or pre-processing before the analysis module M3 to avoid staircase effects being perceived by the human ear.

As such, and as explained hereabove, the device 100 may comprise an interpolation module M4 for a temporal interpolation of the values between two images I. This interpolation may also be used directly on expression data.

As such, the present invention proposes a new innovative approach to effectively control the sound effects of a musical instrument. This approach provides musicians with a new tool enabling them not to be distracted from their musical performance, and enabling them to simultaneously control several sound effects.

It should be observed that this detailed description focuses on a specific example of an embodiment of the present invention, but that in no case is this description restrictive of the possible uses of the invention; on the contrary: it aims rather to avoid any imprecision or false interpretation of the following claims.

The invention claimed is:

1. Control process for a generation module (GM) of sound effects to control one or several sound effects ($EF_A$, $EF_B$, $EF_C$) of a musical instrument (MI), such process being implemented using computer software comprising the following stages:
   a capture stage (S1), consisting in capturing, using a digital camera (10), at least one digital image (I) comprising at least a portion of the user's (U) face, such capture module (M1) comprising emission of a source of infrared light (LUX_IR) in the direction of the user's (U) face, and such capture module (M1) comprising application of an infrared filtering (IRF) using an optical filter (30) to only allow the passage of an infrared wavelength band;
   a processing stage (S2) consisting of processing such at least one image (I) to define at least one expression data ($D\_EX_i$, i being a positive integer) containing information relating to at least one facial expression ($EX_a$, $EX_b$, $EX_c$, $EX_d$) of the user (U); and
   an analysis stage (S3) consisting of comparing such at least one expression data ($D\_EX_i$), determined during the processing stage (S2) to a predefined first database (DB1) to determine at least one sound effect data ($D\_EF_j$, j being a positive integer) containing information relating to at least one sound effect ($EF_A$, $EF_B$, $EF_C$), corresponding to facial expression(s) ($EX_a$, $EX_b$, $EX_c$, $EX_d$) of the user (U), such first database (DB1) comprising a multitude of expression data ($D\_EX_i$) each associated with at least one sound effect data ($D\_EF_j$).

2. Control process according to claim 1, the capture stage (S1) consisting of capturing at least two digital images (I), wherein an interpolation stage (S4) occurs, consisting of interpolating sound effect data ($D\_EF_j$) and/or expression data ($D\_EX_i$) to obtain a multitude of intermediary sound effect data or expression data between two successive digital images (I).

3. Control process according to claim 1, wherein the processing stage (S2) comprises the comparison between facial descriptors ($F\_D_k$, k being a positive integer) with a second database (DB2) comprising a mapping between facial descriptors and one or several facial expressions predefined or recorded by the user.

4. Control process according to claim 3, wherein the second database (DB2), comprising a mapping between facial descriptors ($F\_D_k$, k being a positive integer) and one or several facial expressions, is learned partially or totally from digital images (I) of the face captured by the digital camera (10).

5. Computer readable medium containing program instructions for a computer to perform Computer program comprising instructions to implement the stages of the process according to claim 1, when such computer program is executed by at least one processor.

6. Computer readable medium containing program instructions for a computer to perform Computer program comprising instructions to implement t the stages of the process according to claim 2, when such computer program is executed by at least one processor.

7. Computer readable medium containing program instructions for a computer to perform Computer program comprising instructions to implement the stages of the process according to claim 3, when such computer program is executed by at least one processor.

8. Computer readable medium containing program instructions for a computer to perform Computer program comprising instructions to implement the stages of the process according to claim 4, when such computer program is executed by at least one processor.

9. A control device (100) for a generation module (GM) of sound effects to control one or several sound effects ($EF_A$, $EF_B$, $EF_C$) of a musical instrument (MI), such device (100) comprising:
   a capture module (M1) comprising a digital camera (10) configured to capture at least one digital image (I) comprising at least a portion of the user's (U) face, such capture module (M1) comprising emission of a source of infrared light (LUX_IR) in the direction of the user's (U) face, and such capture module (M1) comprising application of an infrared filtering (IRF) using an optical filter (30) to only allow the passage of an infrared wavelength band;

a computer processing module (M2) configured to process such at least one image (I) in order to define at least one expression data (D_EX$_i$, i being a positive integer) containing information relating to at least on facial expression (EX$_a$, EX$_b$, EX$_c$, EX$_d$) of the user (U); and an analysis module (M3) configured to compare such at least one expression data (D_EX$_i$) with a predefined first database (DB1) to determine at least one sound effect data (D_EF$_j$, j being a positive integer) containing information relating to at least one sound effect (EF$_A$, EF$_B$, EF$_C$), corresponding to facial expressions(s) (EX$_a$, EX$_b$, EX$_c$, EX$_d$) of the user (U), such first database (DB1) comprising a multitude of expression data (D_EX$_i$) each associated with at least one sound effect data (D_Ef$_j$).

10. Device (100) according to claim 9, capture module (M1) configured to capture at least two digital images (I), characterized in that it comprises an interpolation module (M4) temporally interpolating the effect data (D_EF$_j$) and/or the expression data (D_EX$_i$) to obtain a multitude of intermediary effect data or expression data between two successive digital images (I).

11. Device (100) according to claim 9, wherein the processing module (M2) comprises the comparison between facial descriptors (F_D$_k$, k being a positive integer) with a second database (DB2) comprising a mapping between facial descriptors and one or several facial expressions predetermined or recorded by the user.

12. Device (100) according to claim 11, wherein the second database (DB2), comprising a mapping between facial descriptors (F_D$_k$, k being a positive integer) and one or several facial expressions, is learned partially or totally from digital images (I) of the face captured by the camera.

* * * * *